Oct. 6, 1970     W. C. SNEAD     3,531,910
PLANT WRAPPING MACHINE
Filed Nov. 13, 1968     5 Sheets-Sheet 1
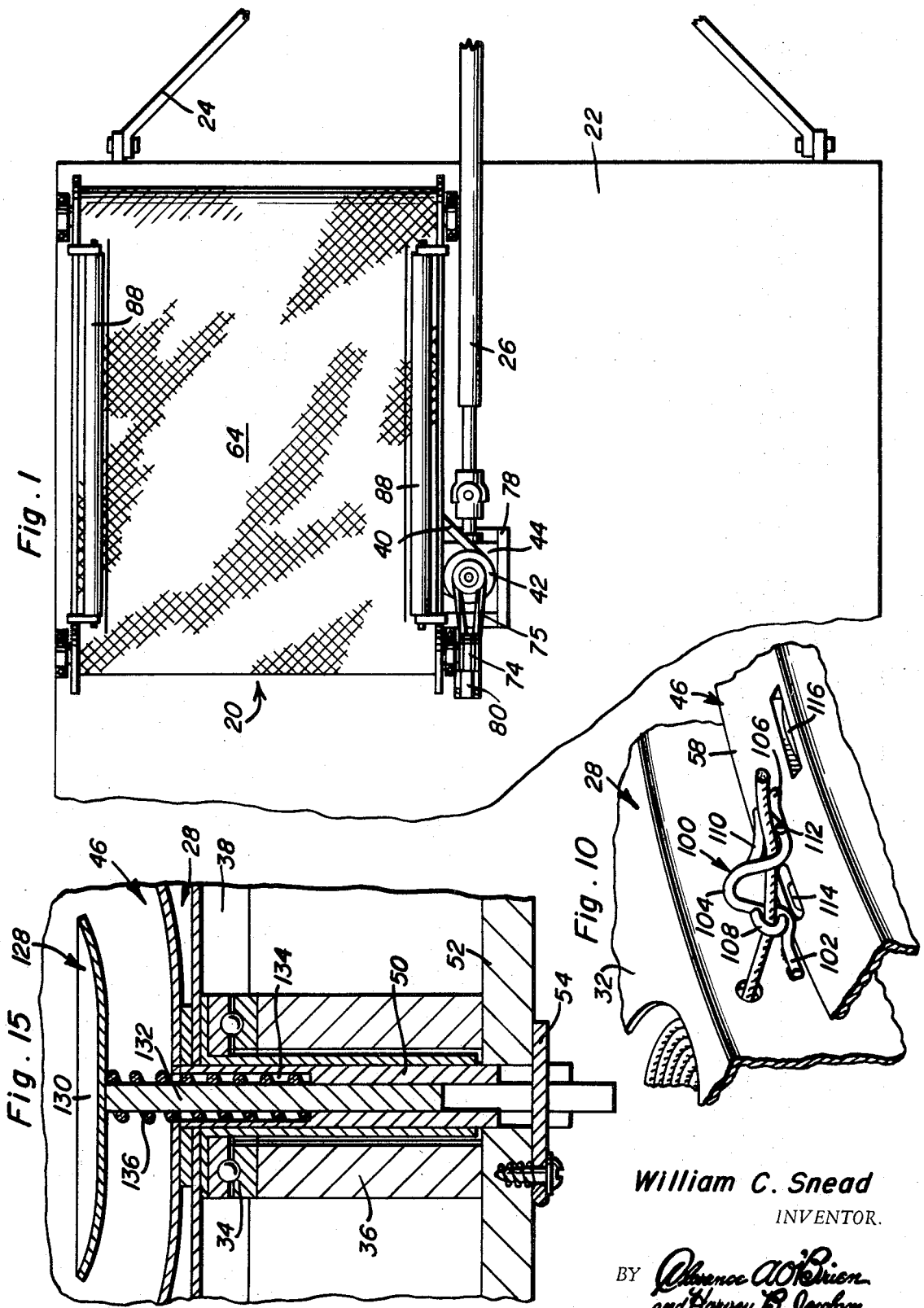
William C. Snead
INVENTOR.

Oct. 6, 1970    W. C. SNEAD    3,531,910
PLANT WRAPPING MACHINE
Filed Nov. 13, 1968    5 Sheets-Sheet 2
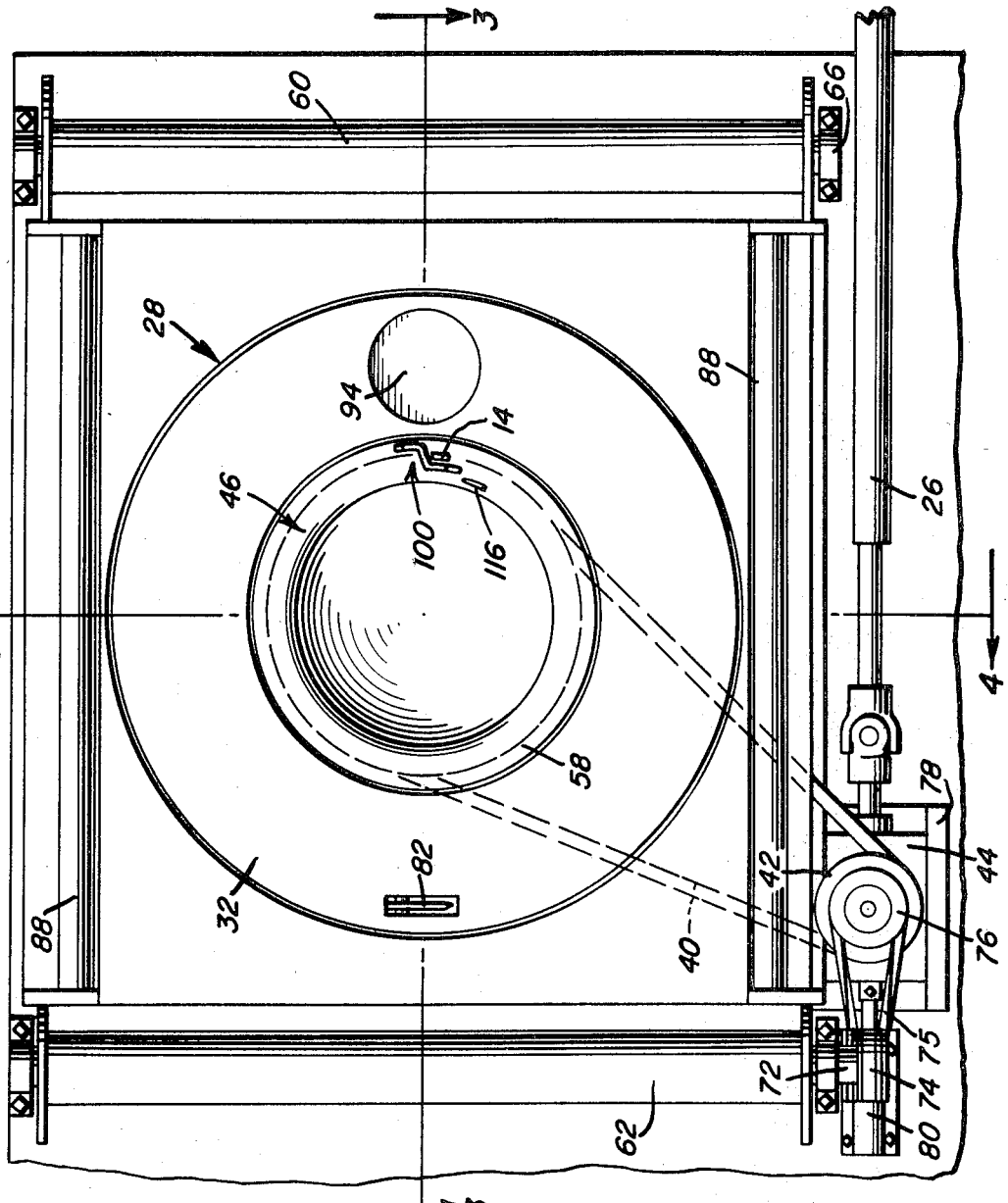
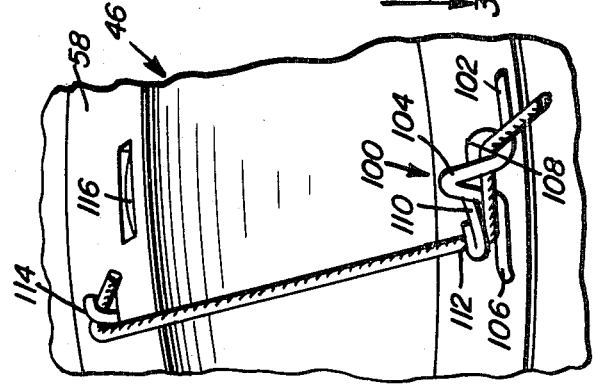
William C. Snead
INVENTOR.
BY *Clarence A. O'Brien*
and *Harvey B. Jacobson*
Attorneys Oct. 6, 1970 W. C. SNEAD 3,531,910
PLANT WRAPPING MACHINE
Filed Nov. 13, 1968 5 Sheets-Sheet 3
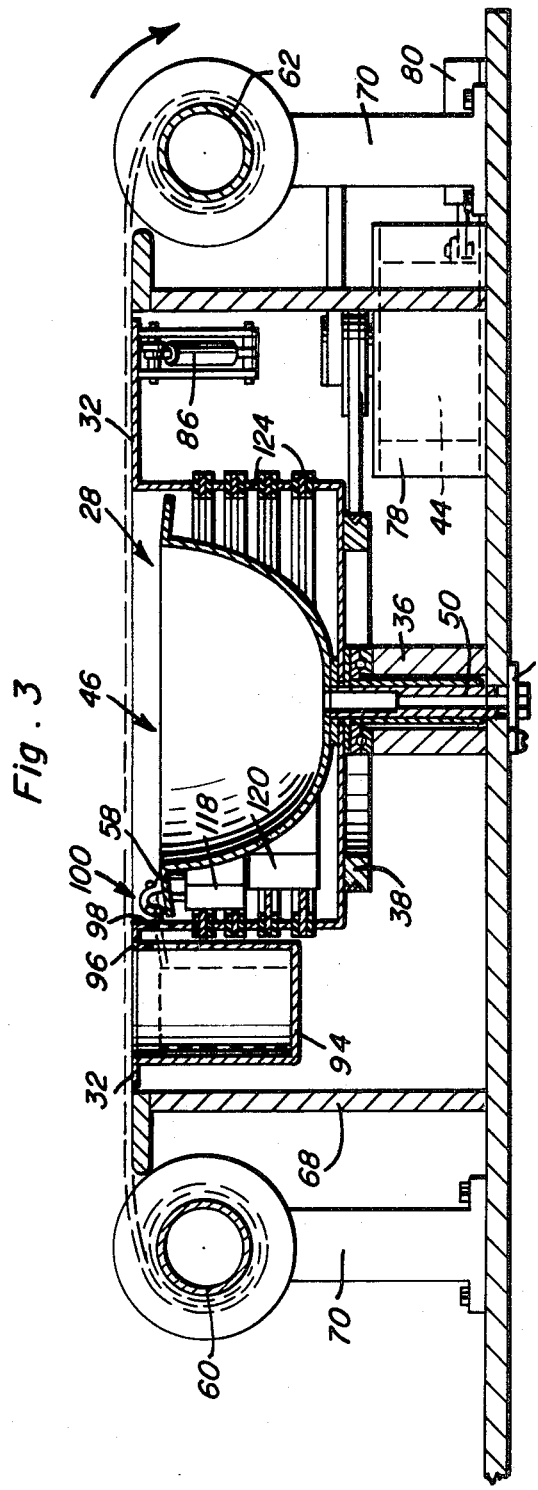
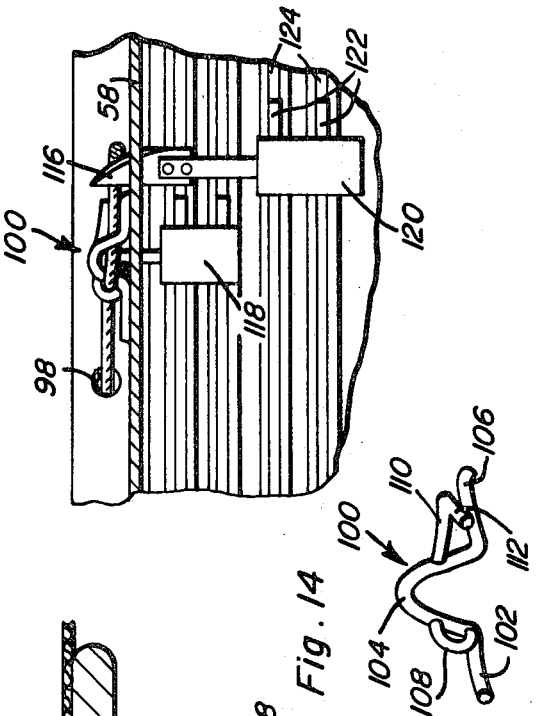
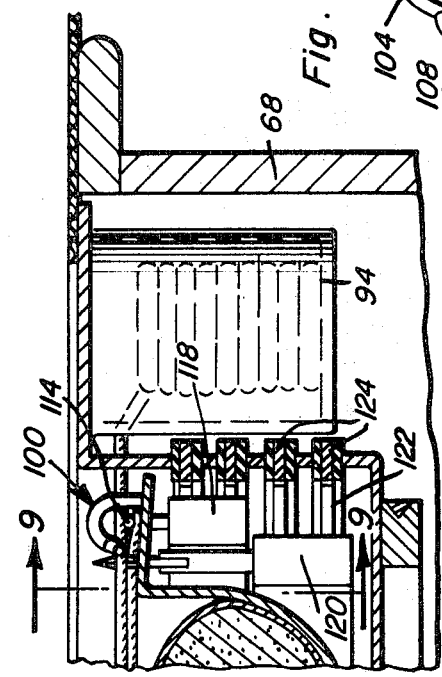
William C. Snead
INVENTOR.

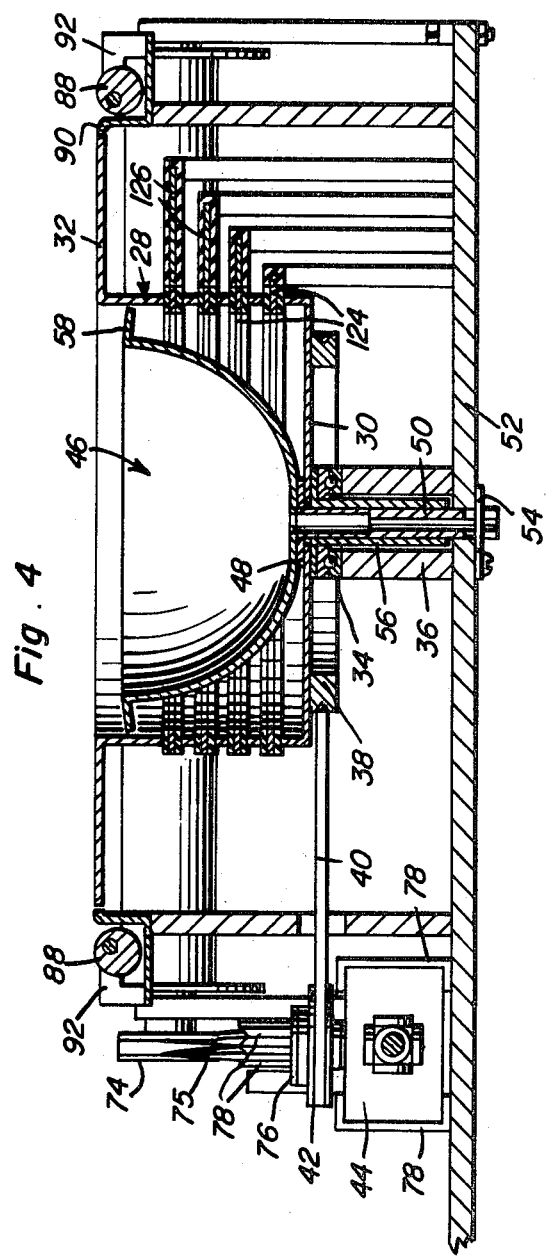
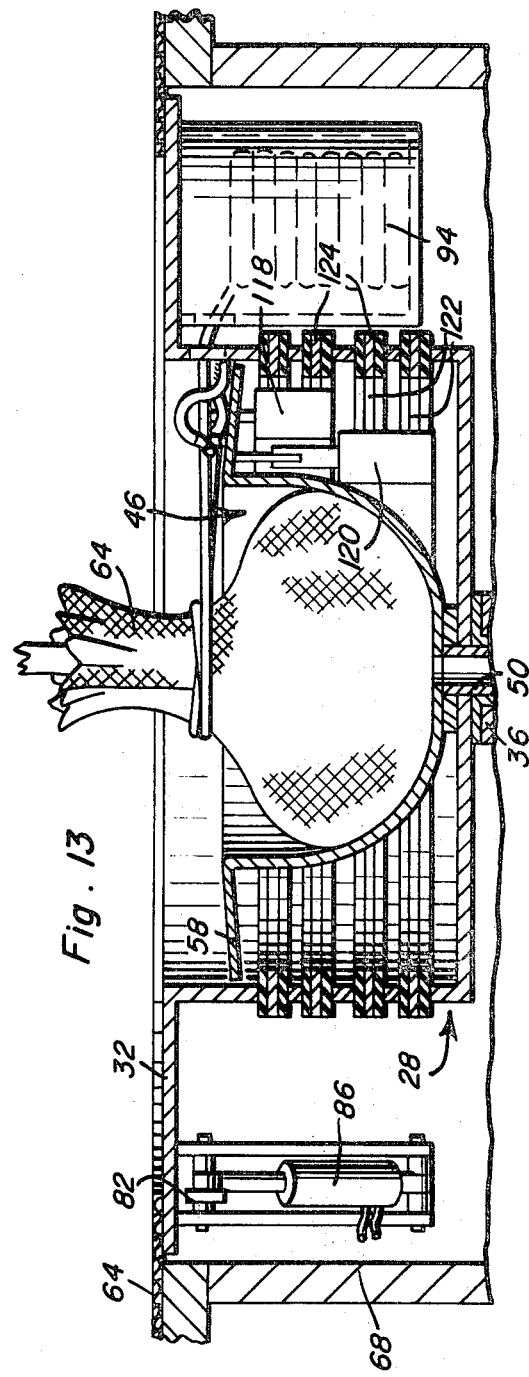

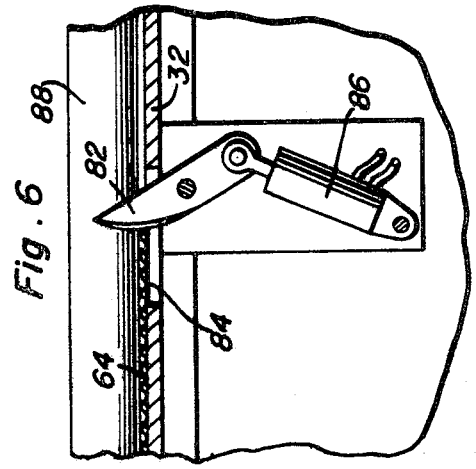
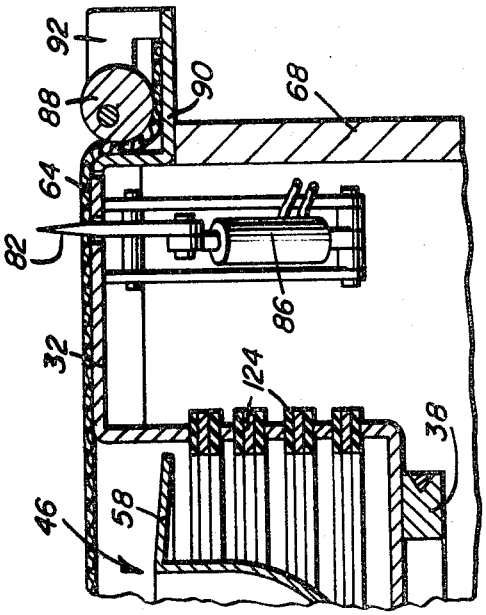
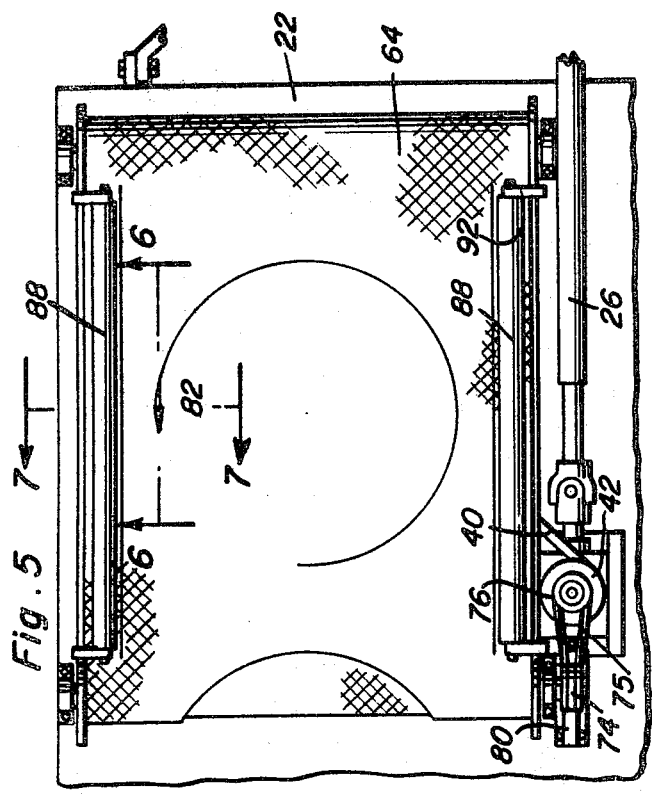
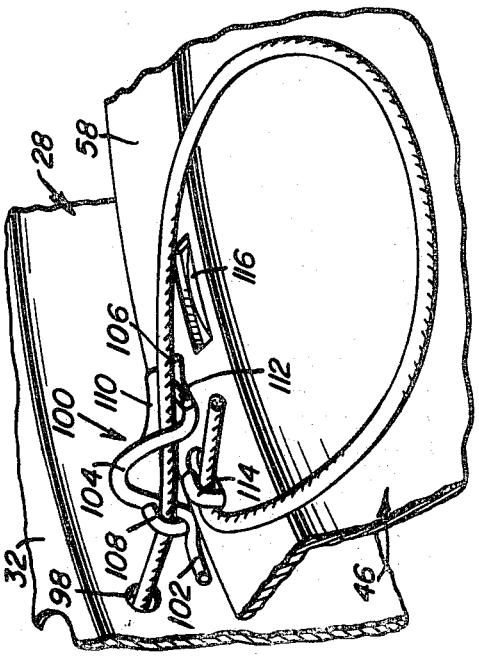

United States Patent Office 3,531,910
Patented Oct. 6, 1970

1

3,531,910
PLANT WRAPPING MACHINE
William C. Snead, Rte. 1, Belton, Mo. 64012
Filed Nov. 13, 1968, Ser. No. 775,379
Int. Cl. B65b 51/08, 11/02, 13/12
U.S. Cl. 53—135                14 Claims

ABSTRACT OF THE DISCLOSURE

A plant receiving tub mounted within a revolving drum which includes a twine controlling member for engaging and moving twine in a circular path about the tub subsequent to the deposit of a plant therein. The tub includes means for engaging one end of the twine prior to a wrapping thereof and means for selectively cutting the twine subsequent to the wrapping operation. A supply roll of burlap is provided on roller means utilized to selectively move the burlap over the tub, after which blade means severs a portion of the burlap which is to constitute the wrap secured about the plant by the encircling twine.

---

The instant invention is generally concerned with the wrapping of plants, and specifically relates to a machine which receives a dug plant, and more particularly the ball of earth provided about the roots thereof, and automatically effects a wrapping of the ball within an appropriate wrap material such as burlap or the like.

It is a primary object of the instant invention to provide a plant wrapping machine which is capable of, subsequent to receiving a plant, automatically effecting an enclosing of the associated ball of earth within appropriate wrap material and securely fastening the wrap material by means of tightly wound twine which gathers the material against the trunk of the plant above the earth ball.

Another significant object of the instant invention resides in the provision of a plant wrapping machine which can be mountable directly on a trailer bed for towing behind a tractor or the like in rearwardly located relation thereto whereby appropriate tractor mounted digging apparatus can be operatively associated therewith for a combined digging and wrapping operation.

Basically, the instant invention includes a plant receiving tub surrounded by a revolving drum, the tub including twine grasping means and the revolving drum including twine guiding and dispensing means for a wrapping of the twine about the plant as the drum revolves. In addition, burlap is wound between a supply roller and a take-up roller for selective positioning over the tub prior to the introduction of a plant, the burlap coming in a continuous strip with the required wrapping portion severed therefrom by means of a selectively extensible blade provided on the revolving drum.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of the apparatus or machine of the instant invention mounted in operative position on a trailer bed;

FIG. 2 is an enlarged top plan view of the apparatus with the burlap removed;

FIG. 3 is a cross-sectional view taken substantially on a plane passing along line 3—3 in FIG. 2;

FIG. 4 is a cross-sectional view taken substantially on a plane passing along line 4—4 in FIG. 2;

FIG. 5 is a top plan view of the apparatus illustrating an operation of the burlap severing blade or knife;

2

FIG. 6 is an enlarged cross-sectional view taken sub-substantially on a plane passing along line 6—6 in FIG. 5;

FIG. 7 is an enlarged cross-sectional view taken substantially on a plane passing along line 7—7 in FIG. 5;

FIG. 8 is a cross-sectional detail illustrating the twine grasping means and the twine cutting means, both associated with the tub, in operative position relative to the twine, and in a position to perform the final step in the wrapping operation, that of severing the twine;

FIG. 9 is a cross-sectional view taken substantially on a plane passing along line 9—9 in FIG. 8;

FIG. 10 is a perspective detail illustrating the twine in its initial position immediately prior to the wrapping operation;

FIGS. 11 and 12 illustrate sequential steps in the wrapping operation;

FIG. 13 is a cross-sectional view of the machine toward the completion of the wrapping operation;

FIG. 14 is a perspective view of the twine controlling needle or member itself; and FIG. 15 is a cross-sectional detail illustrating the incorporation of an auxiliary support within the tub.

Referring now more specifically to the drawings, reference numeral 20 is used to generally designate the apparatus comprising the instant invention. This apparatus will normally be mounted on an appropriate trailer bed 22 for selective drawing behind an appropriate tractor-type vehicle through hitch means 24, the apparatus 20 being so orientated on the trailer 22 as to utilize a power take-off shaft 26 driven directly from the tractor power take-off.

Provided centrally within the apparatus 20 is an enlarged cylindrical upwardly opening drum 28 having an integral flat bottom 30 and an annular outwardly directed flat flange 32 about the upper edge thereof. The drum 28 is rotatably supported, through an appropriate bearing unit 34, on the upper end of a vertically orientated hollow pedestal 36. The desired rotation of the drum 28 is effected by means of an enlarged pulley 38 affixed to the undersurface of the bottom 30 of the drum 28 and an endless belt 40 extending from the pulley 38 to an appropriate drive pulley 42 on a gear box 44. The gear box 44 itself receives the driving force directly from the power take-off shaft 26 coupled thereto.

Mounted centrally within the drum 28 is an upwardly opening hollow generally hemispherical plant receiving tub 46. The bottom of the tub 46 seats on a friction reducing bearing member or washer 48 and is stabilized by a depending hollow shaft 50 which extends through a central opening in the bottom of the drum 28 and through both the hollow pedestal 36 and the underlying base 52. The lower end of the tub shaft 50 is slit for the reception of a shaft locating pin 54 therethrough, this pin being appropriately affixed to the base 52 and acting so as to prevent a rotation of the tub 46 as the drum 28 is rotated. If considered necessary, an appropriate bearing sleeve 56 can be provided about the tub shaft 50. The tub 46 itself terminates below the open upper end of the drum 28 and is provided with a laterally outward directed flange 58 completely thereabout.

Mounted transversely across the opposed ends of the apparatus 20 are a pair of rollers 60 and 62 which receive and control the movement of the wrapping material 64, such normally being burlap. Both rollers 60 and 62 have the opposed ends thereof rotatably mounted within suitable bearing means 66, the roller 60 constituting the supply roller and the roller 62 constituting the take-up roller.

At this point, it might be pointed out that the drum and tub structure will preferably be mounted within an enclosing well 68 which can be defined within and below the deck or bed of the trailer 22 or in an upwardly extending manner thereon as actually suggested in the drawings. In any event, appropriate mounts 70 are to be provided so as to orientate the rollers at a height whereby the burlap moving therefrom and thereto will pass horizontally across the annular drum flange 32.

The take-up roller 62 includes an extending shaft 72 at the end thereof adjacent the gear box 44 with this shaft end having an appropriate belt pulley 74 keyed thereto. The drive belt 75 associated with the pulley 74 is trained about a drive pulley 76 associated with the gear box 44 and direction changing guide pulleys 78 which guide the drive belt 75 from the drive pulley 76 on the roller pulley 74.

It is contemplated that the selective driving of the drum 28 and the roller 62 be effected through a longitudinal shifting of the gear box 44 so as to tension either drive belt simultaneously with a release of the other drive belt. This is effected through a mounting of the gear box 44 slidably within opposed tracks 78 and controlling the sliding movement thereof by means of an appropriate double-acting fluid piston and cylinder unit 80 mounted on the base and engaged with the gear box 44. In order to accommodate this movement, it will of course be appreciated that the power take-off shaft 26 is provided with a pair of drive transmitting telescoping sections.

The roll or strip of burlap 64 is of a width so as to extend transversely across and beyond the drum flange 32, the actual wrapping of a plant being effected utilizing a circular piece of the burlap cut centrally from the portion of the burlap overlying the drum 28 as suggested in FIG. 5. The lateral edge portions of the burlap which are not severed are sufficient so as to enable a continued rolling of the burlap onto the take-up roller 62. The severing of the wrapping portion of the burlap is effected by means of a selectively projectable knife blade 82 pivotally mounted on and immediately below the drum flange 32 for a selective extension upwardly through an appropriate opening 84 in the flange 32 in a manner so as to pierce the overlying burlap 64 and cut therearound as the blade 82 travels with the rotating drum 28. Once the circular section of burlap has been severed from the main strip, the blade 82 will be retracted. This extension and retraction of the blade 82 can be effected in various manners, however, in the preferred form it will be appropriately controlled by a solenoid 86.

Mounted so as to longitudinally overlie the opposed edges of the strip of burlap 64 for a length slightly greater than the diameter of the drum 28 is a pair of gripping rollers 88. An elongated corner forming plate 90 underlies each roller 88 along the length thereof, each of the plates 90 providing in effect a downward step from the plane of the drum flange 32 with the burlap 64 extending downward across each angular plate 90 in underlying reroller 88 is eccentrically mounted on a pair of end located lation to the associated gripping roller 88. Each gripping brackets 92 in a manner whereby the roller 88 tends to fall downwardly and inwardly so as to effect a clamping of the burlap edge portion against the angled plate 90. In this manner, as any force is introduced on the central portion of the burlap 64, such as the cutting action of the blade 82, which tends to draw the burlap laterally inward, this will effect or increase the tendency of the eccentrically mounted rollers 88 to swing downwardly and inwardly whereby a positive clamping of the opposed edges of the burlap is effected in a manner which retains the central portion of the burlap relatively taut during the cutting operation. Upon a release of the means tensioning the central portion of the burlap, and a forward drawing of the burlap onto the take-up roller 62, the gripping rollers 88 will tend to release and allow for a smooth longitudinal sliding of the burlap therebeneath.

With reference to FIGS. 2, 3 and 8, a hollow twine container 94 is affixed to and depends from the drum flange 32 for rotational movement therewith about the central tub 46. This container 94 opens upwardly through the flange 32 so as to simplify the introduction of a supply of twine therein. The twine is dispensed, during the wrapping operation, through a pair of aligned openings 96 and 98 in the wall of the container 94 and the adjacent wall of the drum 28 at a point immediately above the annular flange 58 about the upper edge of the tub 46. Mounted, by welding or an appropriate releasable mounting means, on the inner face of the drum wall immediately adjacent the cord discharging opening 98 therein is a cord guiding member or needle 100. This needle 100 includes an elongated laterally offset mounting leg 102, a laterally extending upwardly arching bridge portion 104 which extends transversely across a portion of the underlying tub flange 58, and a rearwardly and slightly downwardly directed trailing leg 106. A closed guide loop 108 is formed at the transition point between the mounting leg 102 and the bridge portion 104, this loop being set outwardly from the adjoining wall of the drum 28 through an offset in the mounting leg 102. Finally, a forwardly opening rearwardly extending twine grip 110 is provided above the trailing leg 106 immediately behind the bridge portion 104, this grip 110 including a downwardly and forwardly directed portion 112 which acts so as to cooperate with the guide loop 108 in holding the free end of the twine in the manner illustrated in FIG. 10, such constituting the initial stage of the actual wrapping operation.

In order to cooperate with the guiding member or needle 100 in wrapping the twine about a burlap enclosed plant, the tub 46 is provided with both a gripping or hold-down clamp 114 and a twine severing blade 116. Both the hold-down 114 and blade 116 are mounted on the tub 46 below the peripheral flange 58 thereof for selective extension and retraction through appropriate openings in the flange 58. In the illustrated embodiment, it is contemplated that a pair of solenoids 118 and 120 mount the hold-down 114 and twine cutting blade 116 for a selective extension and retraction thereof, these solenoids of course also being properly mounted on the exterior of the tube 46. Further, in order to supply electric current to the solenoids, such are provided with projecting brushes 122 engageable with annular collector rings 124 provided about the rotating drum 28. Noting FIG. 4, the collector rings 124 are in turn communicated with a conventional power source by externally mounted brushes 126 in sliding engagement therewith.

With regard to the actual twine wrapping operation, the initial position of the end of the twine is that illustrated in FIG. 10, the end portion of the twine being received across the upwardly arching bridge portion 104 and held in the closed guide loop 108 and twine grip 110. The twine carrying drum 28 will move toward the left in FIG. 10. However, before it does so, the hold-down or clamp 114, which is in the nature of a bent rod or hook, is vertically extended into the path of the bridge spanning portion of the twin through an energization of the associated solenoid 118. Thus, as the twine moves thereby, it will be hooked on the hold-down 114 which is subsequently allowed to retract, utilizing, if deemed appropriate, an internal biasing spring within the solenoid 118. The retracted hold-down 114, noting FIGS. 11, 12 and 13, thereby firmly clamps the end of the twine against the hub 46, this clamping action of the hold-down 114 as well as the continued forward movement of the drum 28 pulling the extreme end of the twine free from the twine grip 110. The twine, anchored by the hold-down 114, is pulled from the moving supply as the drum 28 rotates about the tub 46. At a point when the needle 100 is approximately diametrically opposed from the hold-down 114, such being the position of the needle 100 slightly before that illustrated in FIG. 11, the diametrically extending twine starts to ride up over the trailing leg 106, advancing further therealong as the needle 100 continues about the trunk of the plant until the twine passes beyond the forwardly and downwardly inclined portion 112 of the grip 110. Then, as the needle 100 approaches its initial or starting position, turning now to FIG. 12, the twine moves, relative to the movement of the needle 110, upwardly and rearwardly on the forwardly inclined grip portion 112 so as to be again received within the forwardly opening twine grip. This engagement of the twine within the grip 110 tends to exert a frictional gripping force on the twine whereby a continued movement of the drum 28 about the tub 46 results in a tight wrapping of the twine about the gathered burlap as illustrated in FIG. 13. Upon the completion of a predetermined number of revolutions, the solenoid 120 is energized, bringing the twine cutting blade 116 into the path of movement of the twine immediately inward of the needle 100. The twine is thus severed, leaving the needle 110 with the end portion of the remaining supply of twine as illustrated in FIG. 10. It has been found that, because of the fibrous nature of wrapping twine, as well as the nature of the burlap itself, that the wrapping of the twine tightly about a burlap enclosed plant trunk does not actually require a tying of the twine ends, however, if such a tying is desired, it can of course be manually effected. Of particular significance with regard to the needle, as should be appreciated from the foregoing description, is the downward and rearward inclination of the trailing leg 106 which allows the twine to ride up thereover after an initial disengagement of the twine from the grip. By the same token the downward and forward inclined portion 112 of the grip 110, which slightly overlaps the trailing leg in outwardly spaced relation therefrom, is also significant in providing for a positive re-engagement of the twine within the grip 110.

Referring now specifically to FIG. 15, an auxiliary plant support 128 is illustrated therein. This auxiliary support includes a dish-shaped plant-receiving plate 130 affixed to a vertically depending stem or post 132 which is in turn slidably received through the hollow shaft 50 depending from the tub 46. The upper portion of the hollow shaft 50 has the bore 134 therein radially enlarged so as to provide a chamber for the reception of an expanded coil compression spring 136 which encircles the stem 132 and has one end engaged against the undersurface of the plate 30 and the other end thereof seated on the inner end of the enlarged bore portion 134, the plate 130 normally being resiliently maintained in upwardly spaced relation relative to the bottom of the tub 46. If deemed desirable, the stem 132 can project below the base and incorporate a split or slotted lower end for a reception of the positioning pin 54 therethrough whereby rotation of the auxiliary support is prevented, The auxiliary support 128, when used, would be of assistance in facilitating the proper introduction of an earth ball, as well as the withdrawal of the wrapped ball because of the tendency of the auxiliary support to balance the introduced load. By the same token, the dished plate 130 of the auxiliary support could be used as a means for supporting smaller balls of earth centrally within the apparatus. Finally, it should be appreciated that smaller tubs, generally similar in shape to the tub 46, can be mounted in the same manner as the auxiliary support 128 should such be considered desirable for the accommodation of smaller plants.

From the foregoing, it will be appreciated that a highly unique plant wrapping machine has been defined. As an initial step in the operation, the gear box 44 is shifted so as to tension the drive belt 75 associated with the burlap take-up roller 62 and simultaneously release the tension on the drive belt 40 associated with the drum. The take-up roller 62 is then driven so as to position a solid piece of burlap over the drum. Once the burlap is properly positioned, the gear box 44 is again shifted so as to tension the drum driving belt 40 and release the driving tension on the belt 75 associated with the take-up roller 62. Next, the burlap severing blade 82 is extended and the drum 28 rotatably driven so as to sever a circular piece of burlap, the opposed edges of the burlap being firmly held by the opposed cam-like gripping rollers 88. Once the circular piece of burlap is severed, the drum rotation is stopped, the burlap possibly sagging slightly into the centrally located tub 46. The plant to be wrapped is then introduced into the tub 46 drawing the burlap down therewith while maintaining the edges of the cut piece of burlap in generally overlying relation to the laterally directed flange 58 about the tub 46. Next, the twine wrapping operation, as detailed supra, is effected with the twine, as it passes closely about the trunk of the plant, tightly drawing the peripheral edge portion of the cut burlap upward and in wrapped engagement thereabout. Once the actual wrapping operation is completed and the twine severed, the plant is to be removed in any appropriate manner, such wrapped plants being, if deemed appropriate, stacked directly on the trailer which mounts the wrapping apparatus 20.

It should of course be appreciated that the wrapping machine of the instant invention is adapted to wrap both shrubs and small trees. Further, while the word "twine" has been used throughout, it should be appreciated that this word is intended to cover all types of flexible wrapping cord. Likewise, while the hold-down and the cord severing and burlap severing knives have been noted as being solenoid operated, various other types of automatic controls therefor can be provided.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A plant wrapping machine for wrapping a plant within a flexible wrapping sheet utilizing an encircling twine, said machine comprising a plant receiving tub, twine holding means on said tub for a releasable securing of one end of a length of twine to said tub, twine storage means mounted for rotation about said tub whereby a selective drawing of twine from the storage means into wrapped engagement about a tub received plant can be effected in response to a rotation of the twine storage means about the tub with an end of the twine held by the twine holding means, and means for positioning a wrapping sheet over said tub prior to the introduction of a plant thereto and in overlying relation to the twine holding means whereby a wrapping of the twine about a tub received plant will result in a gathering of the wrapping sheet about the plant.

2. The machine of claim 1 wherein the means for positioning a wrapping sheet over the tub comprises a pair of transversely elongated rollers located to the opposite sides of said tub, said rollers including a supply roller and a take-up roller mounting and selectively drawing a strip of wrapping material across said tub, drive means for propelling the strip of material from the supply roller to the take-up roller so as to position a portion thereof over said tub, and knife means mounted for movement about said tub for severing a wrapping sheet from the overlying roller mounted material.

3. The machine of claim 2 including a twine guiding member associated with said twine storage means, said member including a pair of laterally spaced twine receiving portions overlying the portion of the tub mounting said twine holding means for a suspension of a length of twine over the holding means as the twine guiding member moves about said tub, said twine guiding member being fixed relative to the storage means for movement therewith.

4. The machine of claim 3 including means for selectively extending said holding means into the path of movement of the twine guiding means between the spaced twine receiving portions for engagement with a supported twine in a twine holding manner.

5. The machine of claim 4 including means for automatically reorientating twine within the spaced twine receiving portions subsequent to an initial engagement of the twine holding means with the twine and an encircling of a tub supported plant.

6. The machine of claim 5 including gripping means located to the opposite sides of said tub and at right angles to the orientation of the rollers, said gripping means being adapted to receive roller mounted strip material passing therethrough between said rollers while precluding a lateral inward movement of said material upon the stressing of an intermediate portion of the strip material between the rollers.

7. The machine of claim 6 including selectively extensible knife means for severing a length of twine from the storage means upon at least one revolution of said storage means about said tub.

8. The machine of claim 1 including a twine guiding member associated with said twine storage means, said member including a pair of laterally spaced twine receiving portions overlying the portion of the tub mounting said twine holding means for a suspension of a length of twine over the holding means as the twine guiding member moves about said tub, said twine guiding member being fixed relative to the storage means for movement therewith.

9. The machine of claim 8 including means for selectively extending said holding means into the path of movement of the twine guiding means between the spaced twine receiving portions for engagement with a supported twine in a twine holding manner.

10. The machine of claim 9 including selectively extensible knife means for severing a length of twine from the storage means upon at least one revolution of said storage means about said tub.

11. The machine of claim 2 including gripping means located to the opposite sides of said tub and at right angles to the orientation of the rollers, said gripping means being adapted to receiving roller mounted strip material passing therethrough between said rollers while precluding a lateral inward movement of said material upon the stressing of an intermediate portion of the strip material between the rollers.

12. A plant wrapping machine comprising a cylindrical upwardly opening hollow drum, means rotatably mounting said drum, means for rotatably driving said drum, an upwardly opening plant receiving tub mounted centrally within said drum, means for fixing said tub against rotation within the rotatable drum, twine supplying means on said drum for rotation therewith, said twine supplying means including a positioning member locating one end of a length of twine in overlying relation to an edge portion of said tub, twine holding means on said tub within the path of movement of the positioning means as the drum moves about said tub for a selective engagement therewith and a drawing of the twin from the supplying means in response to a movement of the drum about the tub, and means for severing the twine upon movement of the drum a predetermined number of times about said tub.

13. The machine of claim 12 including wrap material supplying means, said wrap material supplying means comprising a supply roller located to one side of said drum and a take-up roller located to the other side of said supply drum, said rollers mounting a continuous strip of wrap material or selective movement of the wrap material over said drum and the drum received tub, and material severing means mounted on said drum and movable therewith in a circular path so as to sever a portion of the wrap material from the continuous strip, said severing means being selectively extensible and retractable relative to the drum for engagement with the material or retraction therefrom.

14. The machine of claim 13 including material gripping means orientated in laterally spaced relation to each other between the wrap material rollers, said gripping means allowing for a free movement of the material between the rollers and precluding a transverse inward movement of the material.

References Cited

UNITED STATES PATENTS

| | | | |
|---|---|---|---|
| 2,460,644 | 2/1949 | Luker | 53—135 |
| 3,003,297 | 10/1961 | Broadhead et al. | 53—198 |

THERON E. CONDON, Primary Examiner

N. ABRAMS, Assistant Examiner

U.S. Cl. XR.

53—221, 389; 100—27